United States Patent
Koppenhöfer

(10) Patent No.: US 7,140,863 B2
(45) Date of Patent: Nov. 28, 2006

(54) METHOD FOR PRODUCING A CONTAINER FROM A THERMOPLASTIC FILM, AND MOLDING TOOL FOR EXECUTING THE METHOD

(75) Inventor: Klaus Koppenhöfer, Makati (PH)

(73) Assignee: Illig Maschinenbau GmbH & Co. KG, Heilbronn (DE)

( * ) Notice: Subject to any disclaimer, the term of this patent is extended or adjusted under 35 U.S.C. 154(b) by 553 days.

(21) Appl. No.: 09/986,755

(22) Filed: Nov. 9, 2001

(65) Prior Publication Data

US 2002/0027308 A1    Mar. 7, 2002

Related U.S. Application Data

(63) Continuation of application No. 09/883,511, filed on Jun. 15, 2001.

(30) Foreign Application Priority Data

Jun. 17, 2000    (DE) ................................ 100 30 010

(51) Int. Cl.
*B29C 51/08*    (2006.01)
(52) U.S. Cl. .................. 425/292; 425/388; 425/398; 425/403.1; 425/444
(58) Field of Classification Search ............... 425/394, 425/398, 441, 292, 403.1, 388, 442, 443, 425/444
See application file for complete search history.

(56) References Cited

U.S. PATENT DOCUMENTS

| | | | | |
|---|---|---|---|---|
| 3,692,454 A | * | 9/1972 | Kruger | 425/398 |
| 4,170,621 A | * | 10/1979 | Kiefer | 425/398 |
| 4,565,513 A | * | 1/1986 | Kiefer | 425/289 |
| 4,588,539 A | * | 5/1986 | Rossi et al. | 425/419 |
| 4,758,394 A | * | 7/1988 | Yaita et al. | 425/384 |
| 4,932,856 A | * | 6/1990 | Merklinghaus et al. | 425/302.1 |

FOREIGN PATENT DOCUMENTS

GB    2 079 668    1/1982

* cited by examiner

Primary Examiner—Yogendra N. Gupta
Assistant Examiner—Thu Khanh T. Nguyen
(74) Attorney, Agent, or Firm—Venable LLP; Thomas G. Wiseman

(57) ABSTRACT

A method and a molding tool for producing containers from a thermoplastic plastic film. The method and tool permit the production of containers having a hollow floor and a double-walled standing base, with a seal between the two walls of the standing base. The method permits the production of such a container in large piece numbers, and with a high quality, and allows it to be transferred reliably into a stacking device. The components of the molding tool are subjected to low wear, and the molding tool is unsusceptible to contamination. These features are attained by a constant contact between the mold floor and the container floor between the shaping and stacking processes, and by the creation of a space between the inside wall of the standing base and the outside wall of the mold floor prior to the ejection of the container, the space also permitting the unmolding of a standing base that has a more pronounced undercut or a slightly conical shape.

11 Claims, 5 Drawing Sheets

METHOD FOR PRODUCING A CONTAINER FROM A THERMOPLASTIC FILM, AND MOLDING TOOL FOR EXECUTING THE METHOD

CROSS REFERENCE TO RELATED APPLICATION

This application is a continuation of U.S. patent application Ser. No. 09/883,511, filed Jun. 15, 2001.

This application claims the priority of German patent Application No.100 30 010.3 filed Jun. 17, 2000, which is incorporated herein by reference.

BACKGROUND OF THE INVENTION

The invention relates to a method for producing a container from a thermoplastic plastic film, the container having a hollow floor that forms a double-walled standing base, with the use of a molding tool, and to the molding tool for executing the method.

German Patent No. DE-PS 1 291 469 discloses a generic apparatus, in which containers having a hollow floor or bottom and a double-walled standing base are deep-drawn from a thermoplastic plastic film, and then punched out of the film. The gap between the two walls of the standing base is sealed, because the container floor or bottom is pressed against a shoulder provided around the entire perimeter of the mold when the hollow floor is formed. In this production method, after the hollow floor and the standing base are formed, the ejector floor is retracted, so that, as described in column 14, lines 46–60, of the reference the standing base can shrink inward until the ejector floor impacts the standing base, which now has a smaller diameter, as the ejector floor executes its second upward movement to eject the container. The reduction in the diameter is necessary because of the undercut, which is formed by the shoulder Pos 170, and over which the standing base must be guided as it is ejected. FIGS. 11 and 12 of this document illustrate this desirable, but unrealistic, method particularly well.

The above-described method has various drawbacks. The desired, necessary cooling of the standing base is interrupted and greatly delayed when the ejector floor is retracted, because the floor is usually cooled, which effects the necessary, but no longer guaranteed, cooling. The standing base is cooled further through contact with the cooled container mold. If the standing base shrinks inward, however, it releases from the container mold, immediately halting the cooling process. For the above-cited reasons, the cooling process is very slow, so only a small cycle number is possible with the thermoforming machine due to the poor cooling, on the one hand, and the double lifting movement of the ejector floor, on the other hand, which additionally presupposes a corresponding control. The shrinkage of the standing base is strongly dependent on the plastic material, and the described method cannot be implemented with plastics having a low shrinkage.

FIG. 12 of the reference illustrates particularly clearly that the ejected containers are positioned in an unstable manner on the ejector floor. Ejecting and stacking containers that have already been punched out in the molding tool is therefore highly susceptible to faults, and not applicable in certain stacking methods, e.g., when the molding table is pivoted with the one half of the molding tool for stacking the containers. The containers are then ejected at an incline or horizontally, and would fall from the ejector floor in this method. It is not possible to additionally apply suction to the containers.

European Published Patent Application No. EP 0 259 214 A1 discloses a method for producing containers having a hollow floor or bottom and a standing base, in which the hollow floor and thus the standing base are formed by a two-part mold floor comprising the ejector floor and spreading pliers. The spreading pliers are spring-mounted, so that during the production of the hollow floor, the pliers and the ejector floor execute a lifting movement that forms the hollow floor and the standing base. The spreading pliers press the inside wall of the standing base against the conical container wall, but do not effect a pinched seal comparable to that of the method according to DE-PS 1 291 469. Presently, however, a seal between the two walls of the standing base is required for several reason, for example, to render the container reusable, or extend the shelf life of highly-perishable contents by preventing a product from entering this gap.

A further disadvantage of this known method is that the container is unmolded by means of a further upward movement of the ejector floor without a prior change in the position of the spreading pliers. Consequently, the ejector floor must withdraw the double-walled standing base from the gap between the spreading pliers and the container mold, which requires a certain force that may lead to a permanent deformation of the container. It is practically impossible to cool the inside surface of the standing base, because the spreading pliers Pos 16 would have to be cooled, which would be very complicated. No indirect cooling of the spreading pliers by a cooled ejector floor is provided, and would not be very effective in view of the small contact surfaces between the two parts.

Moreover, the spreading pliers are costly to produce, and the molding tool is susceptible to heavy wear, depending on the per-cycle friction between the spreading pliers and bordering parts in the region of the surfaces Pos 18, 20 and 21, 22, respectively. The pliers have slotted elements for executing their function. Dirt or plastic filings can enter the slots, thus debilitating the spreading pliers and necessitating an involved cleaning of the molding tool.

It is known from German Patent reference No. DE 30 24 683 to produce containers having a conical, welded standing base. For unmolding the containers, which have an undercut, parts of the molding tool are embodied to be displaced perpendicular to the center axis. This type of molding tool cannot be arranged in multiple rows.

Moreover, in a known method of the Assignee, the hollow floor and the standing base are formed by a displaceable ejector floor that is surrounded by an annular sealing bell over the width of the two walls of the standing base. The two components together execute the ejection stroke. This method does not permit a seal between the two walls of the standing base, because it is not possible to unmold an undercut here.

SUMMARY OF THE INVENTION

It is the object of the invention to embody the method such that containers having a hollow floor or bottom and a completely-sealed standing base can be produced with a high cycle number and high quality, in a combination shaping and punching tool, and transferred reliably into a stacking device. The method is intended to permit the molding of containers having a relatively large undercut—also with conical regions—on the standing base. The method is also intended to inflict little wear on the parts forming the hollow floor. The method should not be limited in terms of the container material. The ejection process for the containers is intended to avoid the risk of a permanent deformation of the containers, and the molding tool should be unsusceptible to contamination. The method should also be applicable in multiple-row molding tools.

The above object generally is accomplished according to a first aspect of the present invention by a method for producing a container from a heated thermoplastic plastic film in which: a segment of the plastic film is clamped by the closure of a molding tool comprising an upper tool part and a lower tool part having an inner surface generally corresponding to the shape of the container to be formed; the container is formed by deformation of the clamped film by differential pressure; the container floor is buckled to produce a standing base for the container; a sealing bell presses the buckled container floor, around its perimeter, against a pinched edge of disposed on the inner surface of the lower tool part; an empty space having a desired width is created between the inside surface of the standing base and the outside surface of the mold floor by the retraction of the sealing bell; and, after opening of the molding tool, the standing base is pushed beyond the pinched edge, thereby yielding resiliently in the direction of the outside surface of the mold floor, which causes the container to be ejected from the lower tool part.

Because the directly-cooled ejector floor of the molding tool remains in contact with the container bottom after the molding process, the container bottom is cooled intensively. The creation of a space between the inside surface of the standing base and the outside surface of the ejector floor allows the standing base to yield resiliently into this region during the ejection process, and be guided past the shoulder serving to produce the seal between the two walls of the standing base. This is the case even with relatively large undercuts and conical regions, because in this instance the intermediate space is correspondingly larger. Because the components forming the hollow floor only execute an axial movement, and are not acted upon by lateral forces, the moving parts are subjected to low wear. Because the hollow bottom is seated on the ejector floor during the ejection process, the container is held securely, and can even be held on the floor by means of a vacuum device, if needed, until it is stacked in the stacking device.

The above object is achieved according to a further aspect of the invention by a molding tool for producing a container from a heated thermoplastic plastic film through deep drawing, with the tool comprising: an upper tool part having a compressed-air supply; a lower tool part having at least one blank punch, and shaping parts corresponding to the shape of the container to be produced, disposed within the blank punch; an inwardly directed pinched edge extending around the inner wall of the shaping part adjacent its lower end; an axially displaceable mold floor for the lower tool part and the blank punch, and moveable between a first lowered position and a raised position above the pinched edge; a axially displaceable sealing bell surrounding the periphery of the mold floor, and cooperating with the pinched edge when in a first raised position; and, a drive in operational connection with the sealing bell for displacement of the sealing bell relative to the mold floor.

The method is described in detail by way of a combination molding and punching molding tool, which is built into a corresponding thermoforming machine. The method can be implemented equally well with only a molding tool having a downstream punching tool in a subsequent station.

DESCRIPTION OF THE PREFERRED EMBODIMENTS

Figure 1:
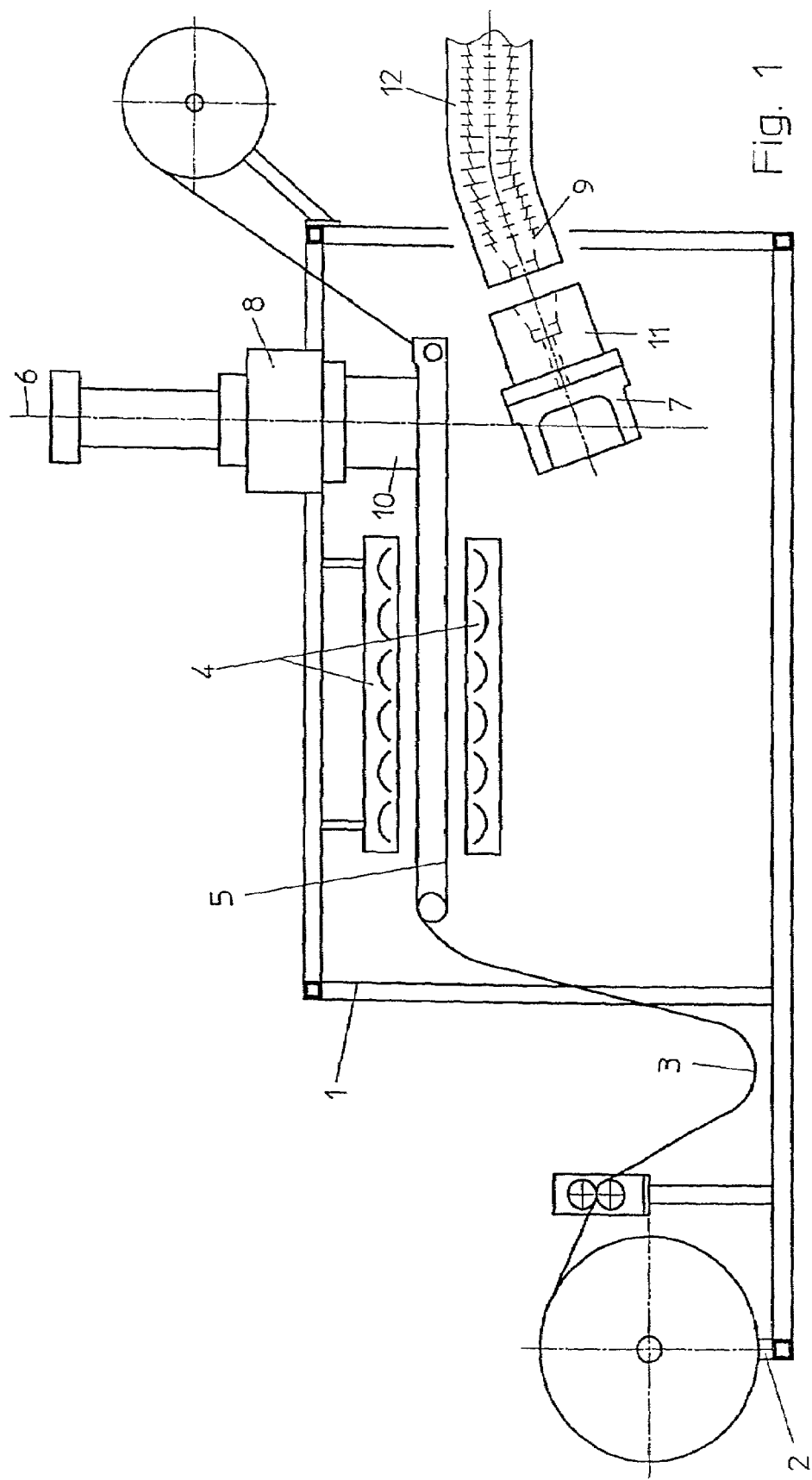
FIG. 1 is a side view of a thermoforming machine to be equipped with the molding tool according to the invention.

The essential components of the thermoforming machine are accommodated in a stand 1, into which the molding tool for executing the method is installed. A roller receptacle 2 provided on the input side is omitted if the thermoplastic plastic film 3 to be shaped is supplied directly from an extruder. The heating device 4 also may not be necessary if the extruder is directly connected. An intermittently-operated transport device 5 guides the plastic film 3 to a molding station 6 having a lower table 7 and an upper table 8. In this station, 6 compressed air or a vacuum serves in shaping and punching out containers 9 with the molding tool, which comprises an upper mold part 10 and a lower mold part 11. After the molding table 7 has been lowered and possibly pivoted with the lower mold part 11, which gives the containers 9 their shape, the containers are ejected into stacking grooves 12 or transferred to appropriate downstream devices.

Figure 2:
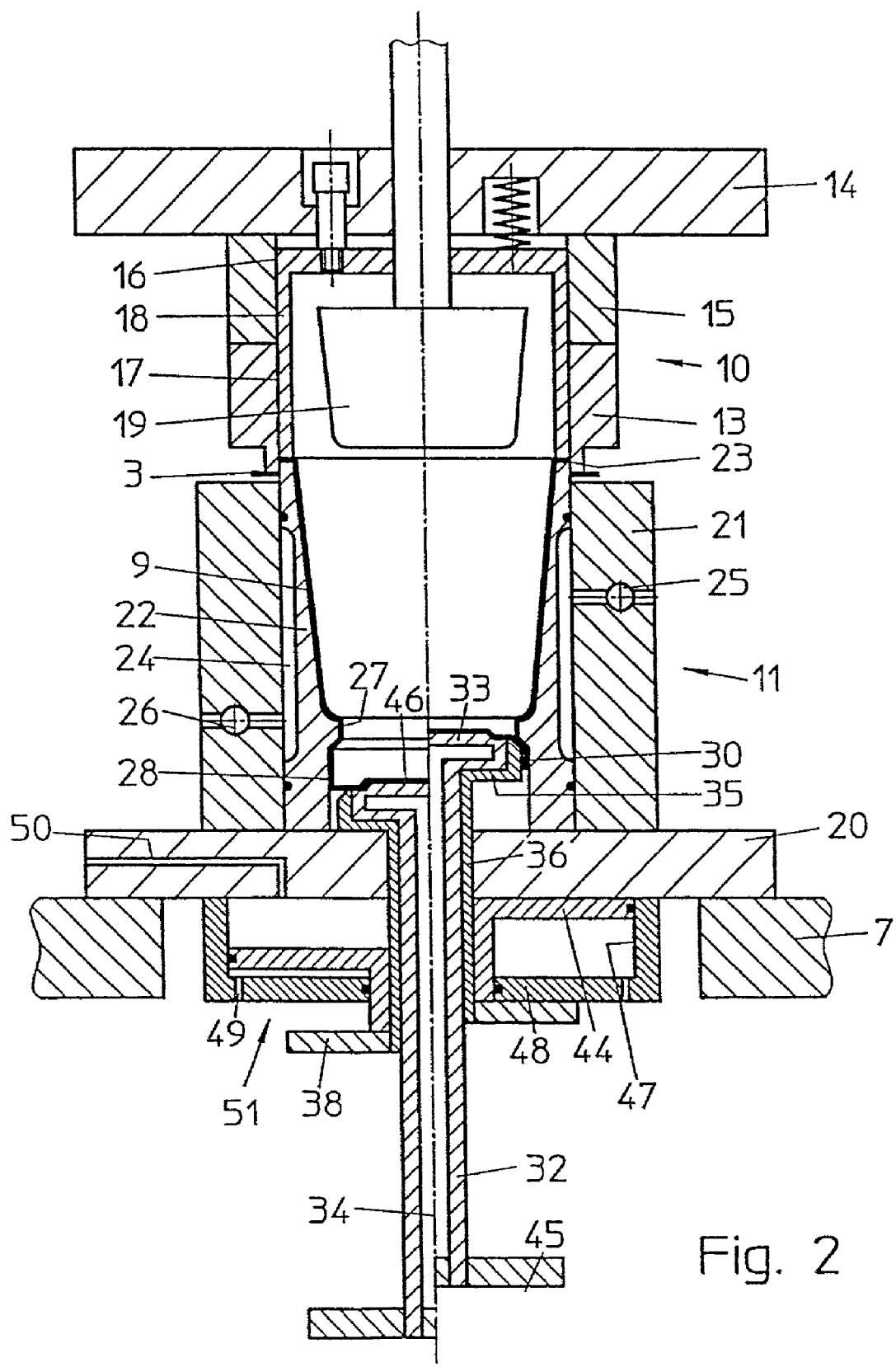
FIG. 2 is a section through the molding tool, in two phases of the method.

FIG. 2 illustrates the design of the molding tool. The upper part 10 comprises a die plate 13, a top plate 14 and an intermediate plate 15, into which the individual mold cavities of a multicavity tool are cut. Here, these parts are disposed in a single row, so that only one cavity is seen but they can also be arranged in multiple rows. The die plate 13 and the intermediate plate 15 have bores 16, 17, in which a displaceable retaining element 18 is disposed. A axially displaceable stretching aid 19 for stretching and shaping the film to help form the film is seated in the retaining element 18.

The lower mold part 11 comprises a base plate 20, a cooling block 21 and, inserted into the block 21, a blank punch 22 whose interior surface has the shape of the containers 9 to be produced and, at its upper and, has a cutting edge 23 that cooperates with the die plate 13 to punch the container 9 out of the film 3 after the molding process. A chamber 24 is provided between the outer surface of the blank punch 22 and the cooling block 21 for conducting cooling water, which is conveyed in or away via bores 25 and 26. In the floor region, the inside mold of the blank punch 22 has an inwardly directed shoulder 27 that extends around the perimeter and then continues in an enlarged diameter region 28. The enlargement corresponds at least to the thickness of a wall 29 of the standing base 30 to be produced (see FIG. 3), so an undercut having a pinched edge 31 is formed.

Seated on a rod 32 in the floor region of each mold cavity (only one being shown) is a axially displaceable mold floor 33. Cooling water flows through the interior of this floor 33 and via one or more bores 34. All of the rods 32 extend through the base plate 20 and are secured to an ejector plate 45 that can be axially displaced in a known manner by a drive, not shown. A sealing bell 35 encircles the base and periphery of the mold floor 33. The bell 35 can be displaced relative to the mold floor by a drive 51, thereby being guided downward through the base plate 20 via a tube 36. The bell 35 is also secured to a retaining plate 38. A piston 44 that is guided to slide in a bore 47 in the plate 48 secured to the base plate 20 is seated on the retaining plate 38. The supply of compressed air via bores 49, 50 in the plate 48 or the base plate 20 serves to axially displace the piston 44, and thus the sealing bell 35. The outside diameter of the sealing bell 35 is slightly larger than the opening cross-section of the shoulder 27.

As shown in FIG. 2, if all of the rods 32 are secured to the ejector plate 45, the upward movement of the sealing bell 35 must carry the mold floor 33 along for shaping the standing base 30, and the two must be configured such that, when they are brought together, they lend the container floor 46 its ultimate shape. When the sealing bell 35 lowers into the position shown in FIG. 3, the mold floor 33 remains stationary. This coupled movement during the shaping of the standing base 30, and the decoupled movement during the downward movement of the sealing bell 35, presuppose a corresponding drive of the ejector plate 45, which holds up the mold floor 33 during the downward movement of the sealing bell 35 by the drive 51, and then executes the necessary upward ejection stroke when the molding tool is open. This course of movement of the ejector plate 45 can be achieved relatively simply with an appropriately-shaped ejector curve.

Figure 6:
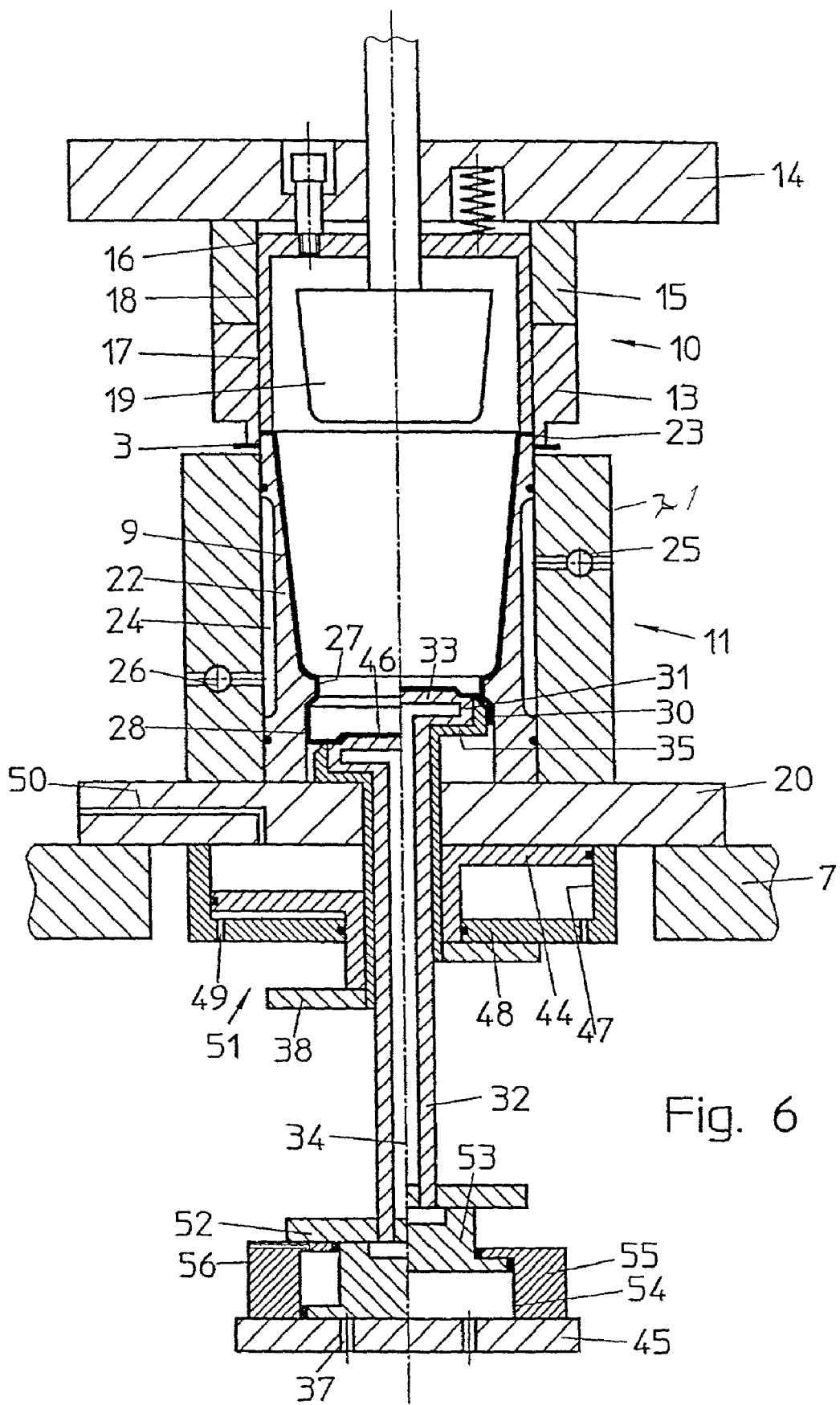
FIG. 6 is a section similar to FIG. 2, with a variation of the drive of the ejector floor.

If a pneumatic drive is provided for the ejector path 45, this course of movement is more difficult to achieve, because the pneumatic drive only assumes two end positions. The position of the ejector plate 45 is not supposed to be changed while the standing base 30 is being shaped, or during the downward movement of the sealing bell 35. This can be achieved with the embodiment of the ejector plate 45 shown in FIG. 6. In this case, the rods 32 are not seated directly on the ejector plate 45, but on a carrier plate 52, which also supports a piston 53 that slides in a bore 54. This bore 54 is provided in a shoulder 55 that is connected to the ejector plate 45. A bore 37 effects the supply of compressed air to the underside of the piston 53, while the bore 56 supplies compressed air to the top side.

The method is executed as follows:

After a heated segment of the plastic film 3 is transported into the molding station 6, the molding tool closes. The container 9 is shaped through the supply of compressed air, and possibly preparatory mechanical stretching by the stretching aid 19. The hollow container floor is thereby preformed, as shown on the left in FIG. 2. The hollow container floor then is shaped (as shown on the right in FIG. 2) by a joint upward axial movement of the mold floor 33 and the sealing bell 35. The mold floor 33 seated in the sealing bell 35 is carried along by the lifting movement of the sealing bell 35 (position of ejector plate 45 changes in FIG. 2), or by the supply of compressed air via the bore 56 (position of ejector plate 45 remains unchanged in FIG. 6). The side wall of the base portion of the container is consequently turned up, and the gap of the formed double-walled standing base 30 is sealed due to the pressing of the sealing bell 35 and the pinched edge 31. Following a predetermined cooling period, the molding air escapes, and the container 9 is punched out of the film 3 in a slight closing movement of the molding tool in a conventional manner. The molding tool then opens, and the sealing bell 35 is returned to the position shown in FIG. 3. A gap having the width B forms between the inside surface of the standing base 30 and the outside or peripheral surface of the mold floor 33. For ejecting the container 9, the mold floor 33 is pushed out or axially upward, and the undercut of the standing base 30 slides past the pinched edge 31, because the standing base 30 can yield resiliently inwardly into the empty space having the width B (position shown in a dot-dash line in FIG. 3). After the container 9 has been ejected, the mold floor 33 returns to the initial position (cam-controlled embodiment on the left in FIG. 2, or pneumatically, in the embodiment shown in FIG. 6), and the next cycle is performed.

Directly cooling the sealing bell 35 usually fails for various reasons. If, however, the mold floor 33 and the sealing bell 35 are guided toward one another by a cylindrical fit with little play, the sealing bell 35 is indirectly cooled by the cooled mold floor 33, with which it is in constant contact.

Figure 3:
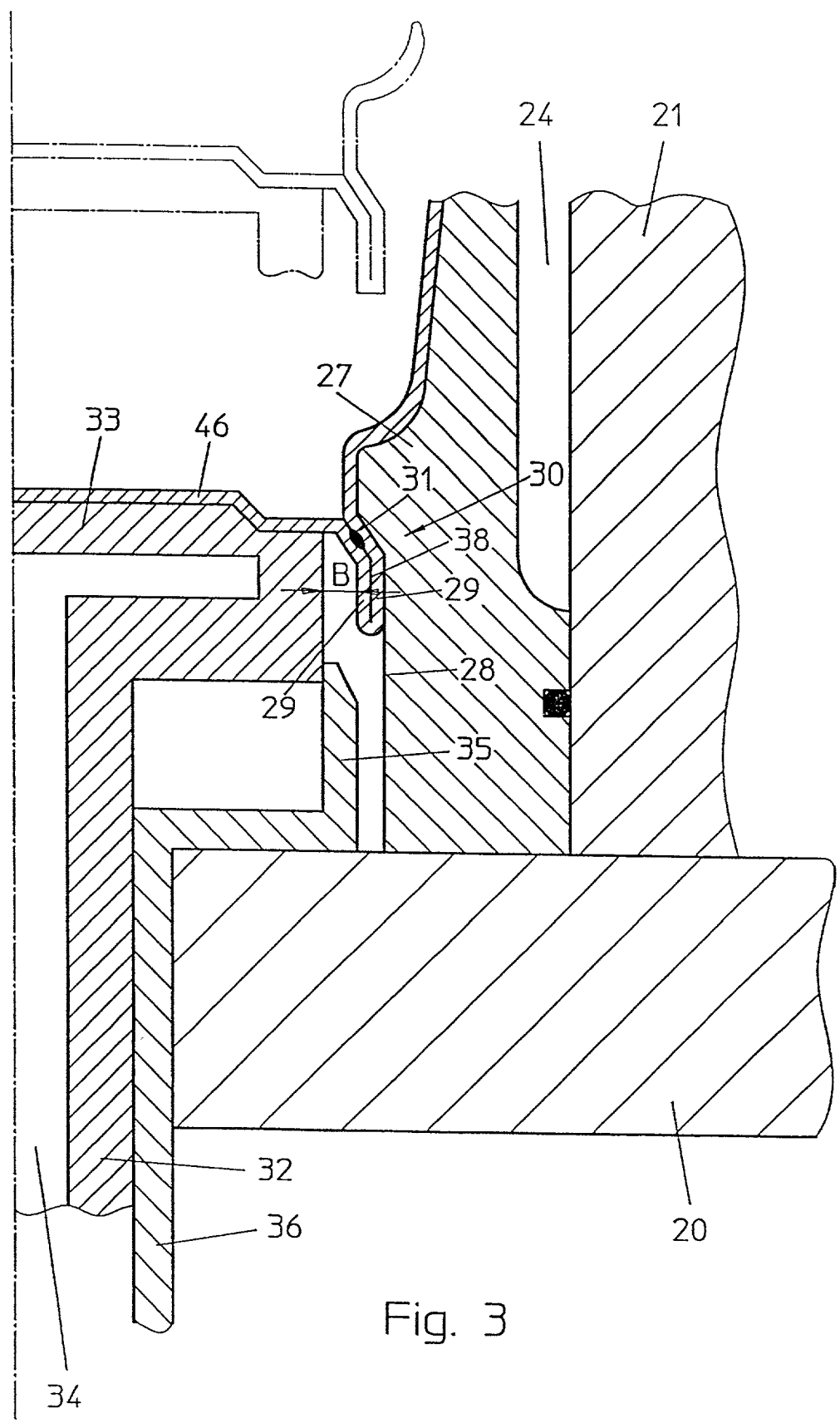
FIG. 3 is an enlarged representation of a region of the molding tool in the third method phase, and—shown in a dot-dash line—after the container has been ejected.
Figure 4:
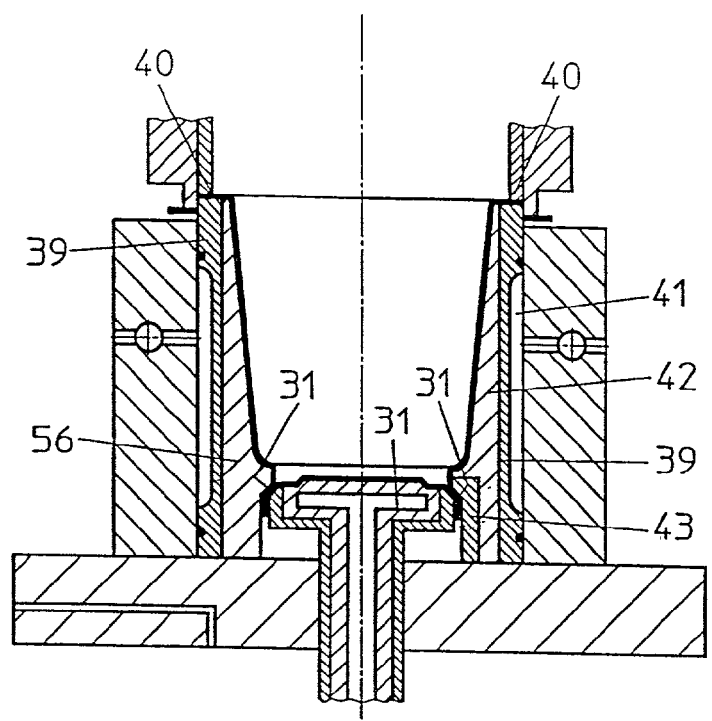
FIG. 4 shows two variations of the embodiment of a blanking stamp and shaping parts of the molding tool.

In FIGS. 2 and 3, the blank punch 22 is produced in one piece such that it creates the shape of the container 9 on the inside, and effects the creation of the pinched edge 31. In certain cases—for example, as shown on the right in FIG. 4—it is advantageous to place a mold insert 42, preferably comprising aluminum, inside a blank punch 39 having a cutting edge 40 and a chamber 41. For creating a wear-proof pinched edge 31, it is proposed here to insert a ring 43, preferably comprising hardened steel, into the mold insert 42 to generally form the edge as shown in the left hand side of FIG. 4. Another solution is to insert a one-piece mold insert 56, comprising hardened steel and having a formed-on pinched edge 31, into the blanking punch 39.

Figure 5:
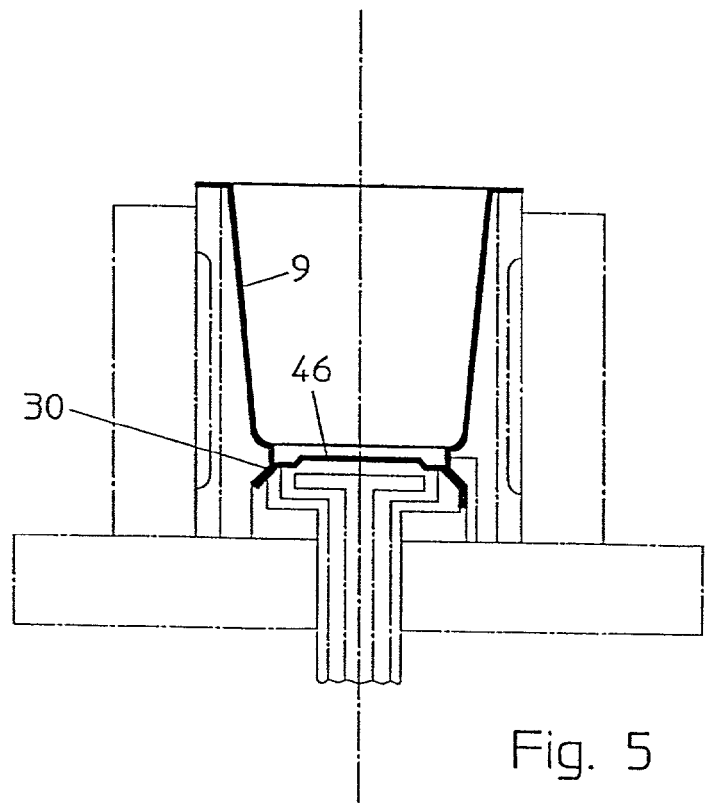
FIG. 5 is a section through an embodiment of a container that can be produced with the method.

FIG. 5 shows a hollow-floor container 9 in which the standing base 30 is slightly conical (on the left in FIG. 5), and can be adjoined by a cylindrical region (on the right in FIG. 5). It FIG. 5 further depicts how the container can be created with the method according to the invention. The shape of the molding tool is indicated as a dot-dash line. Hollow-floor containers having this standing-base embodiment can only be deep-drawn and unmolded with divided molds in accordance with the known methods, additionally processed in a separate tool or produced in a costly injection-molding method.

The invention now being fully described, it will be apparent to one of ordinary skill in the art that many changes and modifications can be made thereto without departing from the spirit or scope of the invention as set forth herein.

What is claimed is:

1. A molding tool for producing a container (9) having both a base (30) and pinched edge, leg, (31) from a heated thermoplastic plastic film (3) through deep drawing, the tool comprising, an upper tool part (10) having a compressed-air supply;

a lower tool part (11) having at least one blank punch (22) which has an axis and an interior surface and shaping parts, defining a cavity which has a perimeter and corresponds to the shape of the container (9) to be produced, wherein the interior surface has a shoulder (27) that extends inwardly around the perimeter and then continues in an enlarged diameter region (28), which enlargement region corresponds at least to the thickness of a wall (29) of the standing base (30), so that an undercut having a pinched edge (31) can be formed, disposed within the blank punch (22);

an axially displaceable mold floor (33) for the lower tool part (11), which mold floor (33) receives a water flow via one or more bores (34) and connects to an axial displaceable rod (32) containing the bores (34), and the blank punch (22), and moveable between a first lowered position and a raised position above the pinched edge (31) by the axial displaceable rod (32);

an axially displaceable sealing bell (35), surrounding the periphery of the mold floor (33), and having the surface capable of cooperating with the shoulder (27) when in a first raised position to form the container pinched edge, leg (31);

a drive in operational connection with the sealing bell (35) for separate displacement of the sealing bell (35) relative to the mold floor (33).

2. A molding tool for producing a container (9) both a base and a pinched edge, leg, (31) from a heated thermoplastic plastic film (3) through deep drawing comprising, an upper tool part (10) having a compressed-air supply;

a lower tool part (11) having at least one blank punch (22), which has an axis and an interior surface and shaping parts, defining a cavity which has a perimeter and corresponds to the shape of the container (9) to be produced, wherein the interior surface has a shoulder (27) that extends inwardly around the perimeter and then continues in an enlarged diameter region (28), which enlargement region corresponds at least to the thickness of a wall (29) of the standing base (30), so that an undercut having a pinched edge (31) can be formed, disposed within the blank punch (22);

an axially displaceable mold floor (33) for the lower tool part (11), which mold floor (33) connects to an axial displaceable rod (32), and the blank punch (22), and moveable between a first lowered position and a raised position above the shoulder (27) by the axial displaceable rod (32);

an axially displaceable sealing bell (35) surrounding the periphery of the mold floor (33), and having the surface capable of cooperating with the shoulder (27) when in a first raised position to form the pinched edge, container leg (31); and a drive in operational connection with the sealing bell (35) for separate displacement of the sealing bell (35) relative to the mold floor, wherein the mold floor (33) and the sealing bell (35) are guided axially relative to one another by a cylindrical fit of the floor (33) into the bell (35).

3. The molding tool according to claim 2, wherein the drive acts on a retaining plate (38), with which all sealing bells (35) of a multicavity molding tool are connected, and the retaining plate (38) is connected to a piston (44) that is displaceable in a bore (47) in a plate connected to a base plate (20) for the lower part of the tool.

4. The molding tool according to claim 2, wherein the mold floor (33) is attached to a rod (32) that is connected to an ejector plate (45), which is connected to all the rods (32) of a multicavity molding tool, for selectively axially moving the mold floor (33).

5. The molding tool according to claim 4 wherein the rod (32) is rigidly connected to the ejector plate (45).

6. The molding tool according to claim 4 wherein the rod (32) is rigidly connected to a carrier plate (52), to which all rods (32) of a molding cavity tools are connected, that is axially displaceable relative to the ejector plate (45).

7. The molding tool according to claim 6, wherein the carrier plate (52) is connected to a piston (53) that is axially displaceable in a bore (54) in a shoulder (55) secured to the ejector plate (45).

8. The molding tool according to claim 2, wherein the shaping part comprises a mold insert (56) disposed within the blank punch that has a cutting edge (23).

9. The molding tool according to claim 2 wherein the blank punch (22) has a cutting edge (23) at its upper edge and the blank punch (22) and the shaping parts are integrally formed as one piece.

10. The molding tool according to claim 2, wherein the shaping parts comprise a mold insert (56) and a ring (43) having the pinched edge disposed within the blank punch having a cutting edge.

11. The molding tool according to claim 10, wherein the ring (43) comprises hardened steel.

* * * * *